United States Patent [19]

Calhoun et al.

[11] 4,192,067
[45] Mar. 11, 1980

[54] APPARATUS FOR CUTTING THROUGH A TUBE BUNDLE

[75] Inventors: Gregory L. Calhoun, Monroeville, Pa.; Arthur W. Kramer, Doctors Inlet, Fla.; Frank I. Bauer, Perry Township, Landinburg County; William A. Bencloski, Swickley, both of Pa.

[73] Assignee: Westinghouse Electric Corp., Pittsburgh, Pa.

[21] Appl. No.: 954,041

[22] Filed: Oct. 23, 1978

[51] Int. Cl.² .................. B23D 19/06; B23D 21/00; B27B 7/04
[52] U.S. Cl. ......................... 30/379; 51/37; 83/483
[58] Field of Search .............. 51/37, 34 D; 30/379, 30/16 G, 92, 94; 83/483, 490; 144/2 R, 323

[56] References Cited

U.S. PATENT DOCUMENTS

| 999,212 | 8/1911 | Dillon et al. | 83/490 |
|---|---|---|---|
| 1,962,489 | 6/1934 | Elbert | 51/37 X |
| 2,171,541 | 9/1939 | Crouch | 51/34 D |
| 2,463,232 | 3/1949 | Zimicki | 30/379 |
| 2,566,088 | 8/1951 | LeTourneau | 30/379 X |
| 2,685,766 | 8/1954 | McGovern | 51/34 D |
| 2,927,613 | 3/1960 | Franzen | 83/483 X |
| 3,032,956 | 5/1962 | Mullet | 30/379 X |
| 3,785,705 | 1/1974 | Binger | 30/379 X |

*Primary Examiner*—Jimmy C. Peters
*Attorney, Agent, or Firm*—F. J. Baehr, Jr.

[57] ABSTRACT

Cutting apparatus having spaced apart cutters which can be brought closer together are disposed on one end of a boom which is movable in a plane transverse to the longitudinal axis of a closely packed tube bundle to cut out short segments from the tubes starting at the periphery and working through the tube bundle by bringing the cutters closer together to provide clearance as the cutters move deeper into the tube bundle.

17 Claims, 11 Drawing Figures

APPARATUS FOR CUTTING THROUGH A TUBE BUNDLE

BACKGROUND OF THE INVENTION

This invention relates to apparatus for cutting through a tube bundle and more particularly to such apparatus which cuts through the tube bundle while the tube bundle is disposed within a vessel. To retube a nuclear steam generator which is disposed in place in a containment vessel requires apparatus which will rapidly cut through the tube bundle adjacent the tube sheet. Fly cutters which fit inside the tubes have been used, but are slow and prevent other necessary operations from being performed on the tubes and tubesheet while the cutting operation is in progress.

After the tube bundle is cut through and removed the stub ends must be pulled from the thick tubesheet. This operation can take place from either or both sides of the tubesheet.

A patent application filed by the same assignee on Sept. 19, 1977 and assigned Ser. No. 834,855 describes the method of retubing a steam generator utilizing apparatus described in this invention and is hereby incorporated by reference.

SUMMARY OF THE INVENTION

In general, apparatus for cutting through a tube bundle formed from closely packed tubes disposed within a vessel, when made in accordance with this invention, comprises a base, a boom pivotally mounted with respect to the base to generally move in a plane transverse to the longitudinal axis of the tube bundle, a pair of cutters for cutting the tubes simultaneously at two places disposed on one end of the boom, and a device for moving the cutters toward and away from each other, whereby short segments of tubes can be cut from the tube bundle to cut the tube bundle free from the tubesheet.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
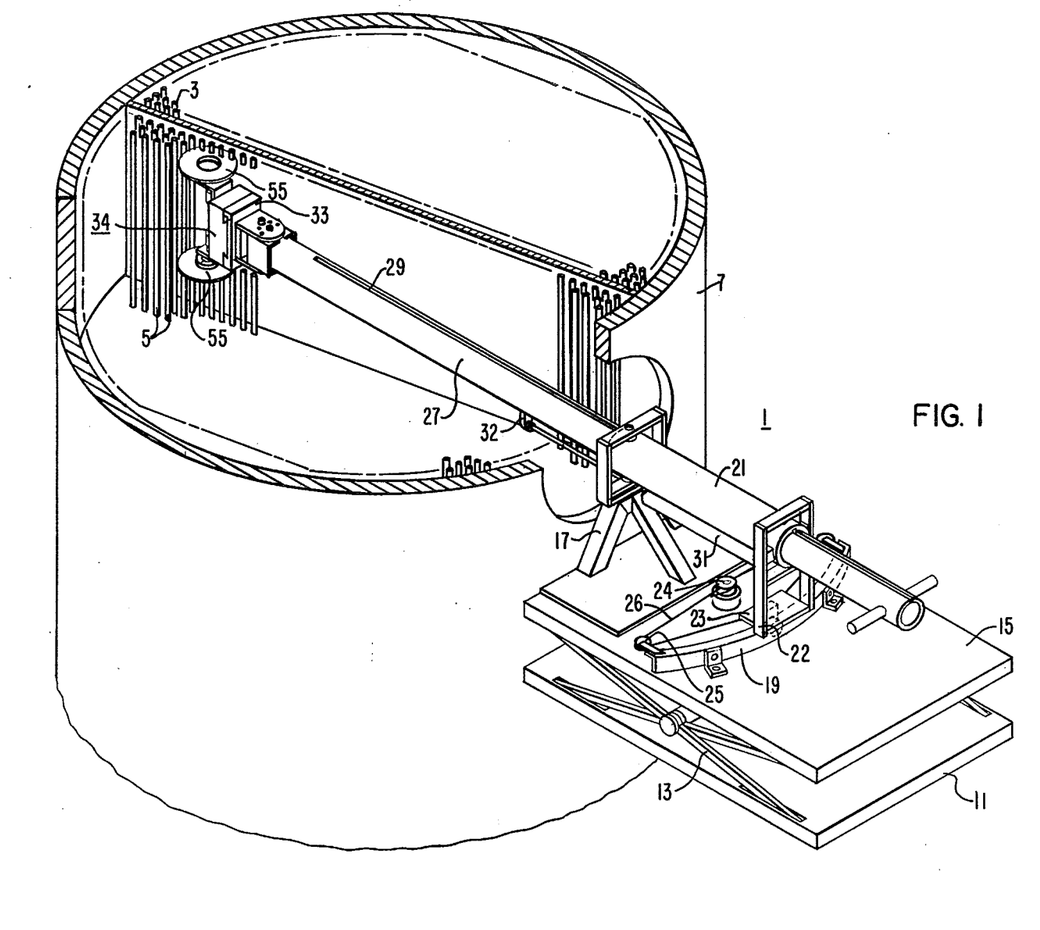
FIG. 1 is a perspective view of cutting apparatus made in accordance with this invention.
Figure 2:
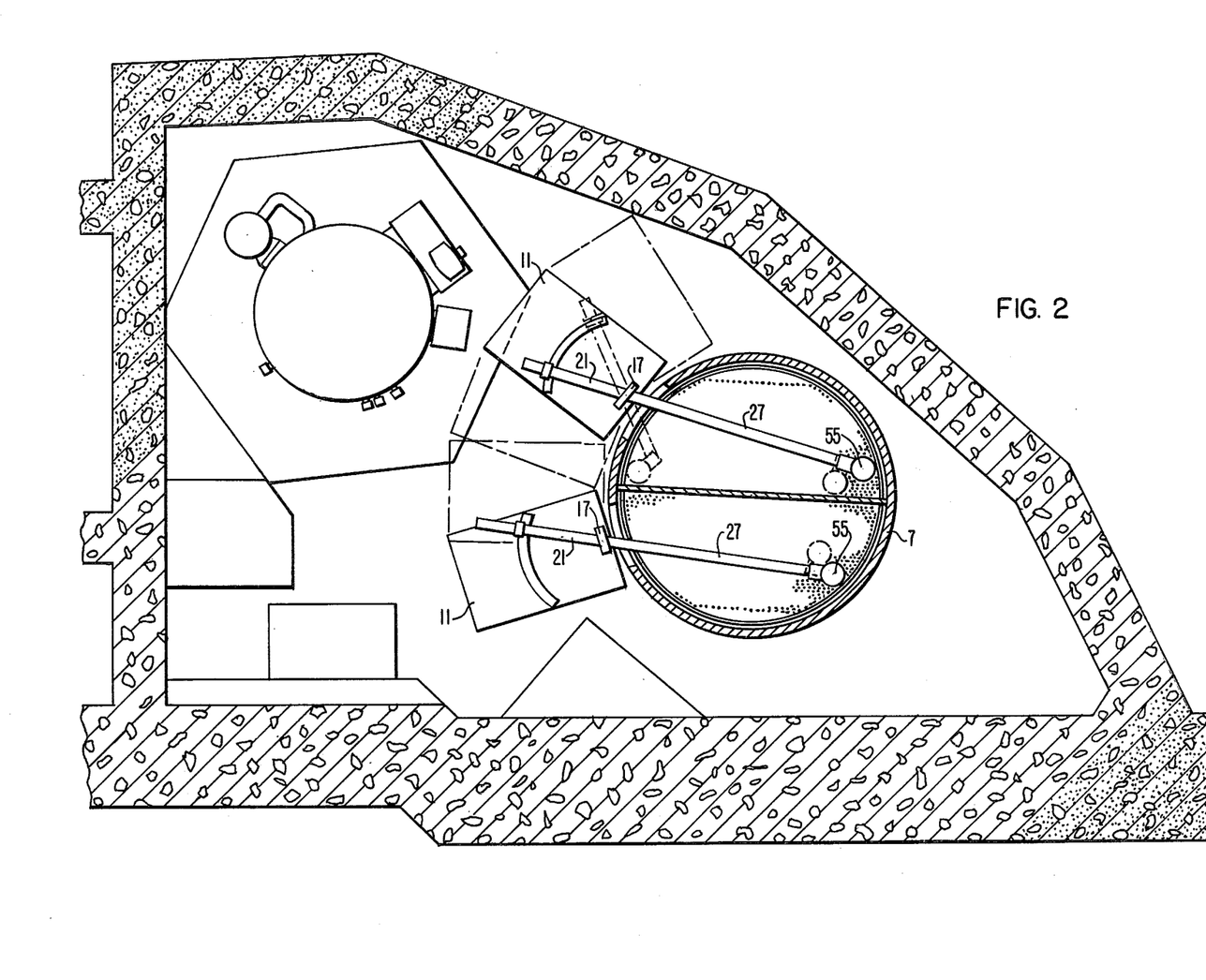
FIG. 2 is a sketch showing the position of the apparatus required to cut through one half of a bundle of closely packed U-shaped tubes of a steam generator disposed in a containment vessel.

Referring now to the drawings in detail and in particular to FIGS. 1 and 2, there is shown apparatus 1 for cutting through a tube bundle 3 formed from closely packed U-shaped tubes 5 while the tube bundle 3 is disposed in a vessel 7 having holes 9 disposed therein to provide access to the tube bundle 3.

The apparatus 1 comprises a base 11 having a scissors jack 13 or other means for adjusting the elevation thereof.

Figure 3A:
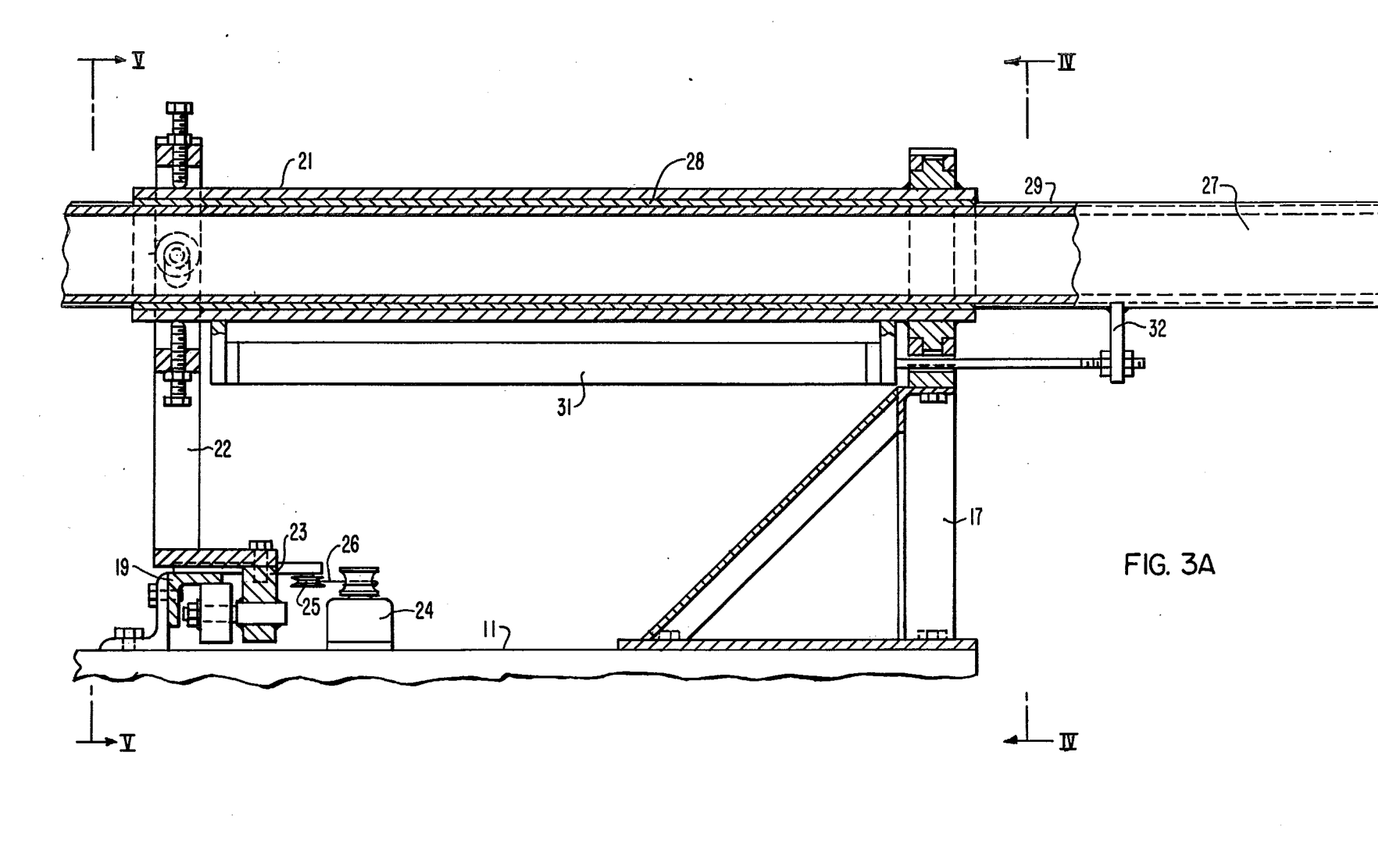
FIGS. 3A and 3B is an elevational view of a base and sleeve utilized in the apparatus.
Figure 3B:
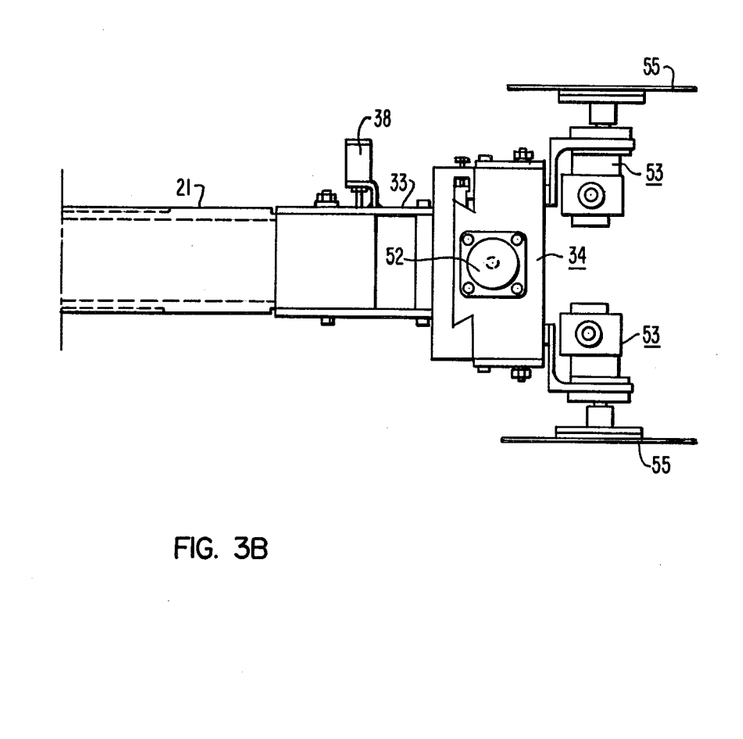
Figure 4:
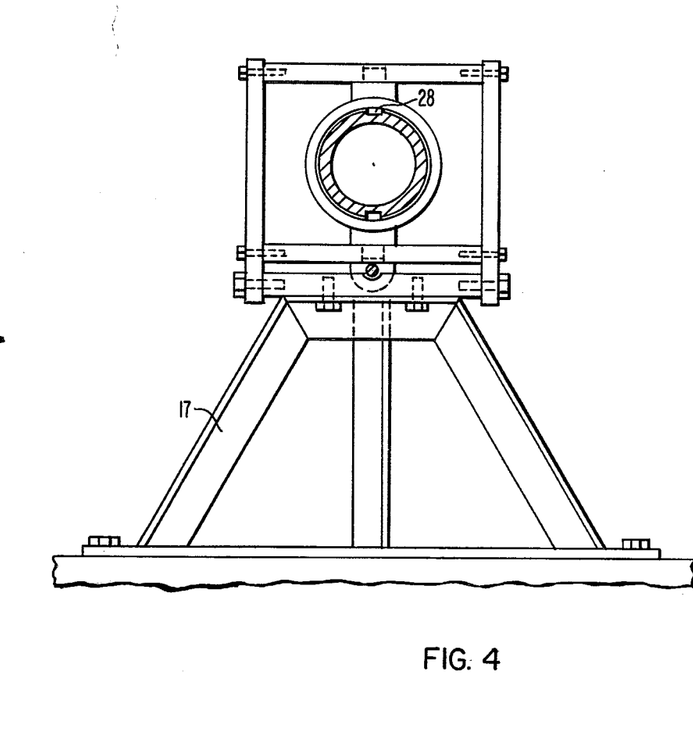
FIG. 4 is a sectional view taken along line IV—IV of FIG. 3.
Figure 5:
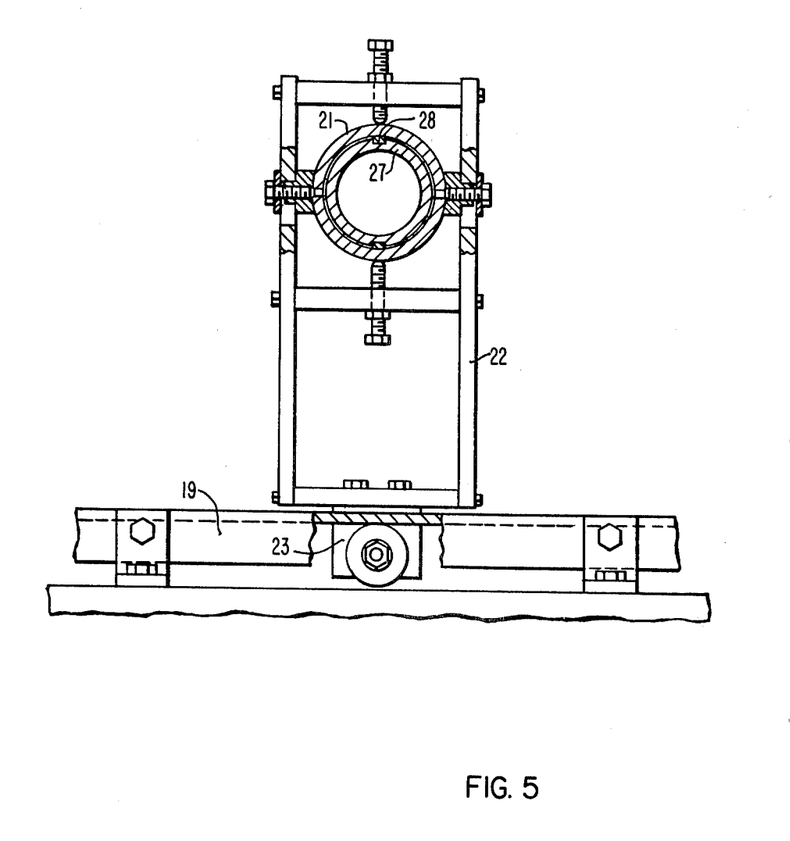
FIG. 5 is a sectional view taken along line V—V of FIG. 3.

As shown best in FIGS. 3, 4 and 5 mounted to the base 11 is a platform 15 having a support bracket 17 which extends upwardly from the platform 15. An arcuate track 19 is also fastened to the base 11 in a spaced relationship with the support bracket 17. A sleeve 21 has one end pivotally mounted on the support bracket 17 so that it can pivot in a plane transverse to the longitudinal axis of the tube bundle. A leg 22 depends from one end of the sleeve 21 and has a foot 23 which engages the track 19. The track 19 is fastened to the base 11 in order to keep the sleeve 21 in the transverse plane as the sleeve is pivoted in the support bracket 17.

A hydraulic wench 24 disposed on the base 11 cooperates with sheaves 25 disposed on the ends of the track 19 and with a cable 26, which winds around the wench 24, runs over the sheaves 25, and is connected to the foot 23, to remotely pivot the sleeve 21.

A boom 27 is slidably disposed in the sleeve 21. The sleeve 21 and boom 27, as shown in FIGS. 3, 4 and 5, have tongue 28 and groove 29 guides, or other means disposed therein, to prevent rotation of the boom 27 with respect to the sleeve 21 and still permit longitudinal sliding of the boom 27 in the sleeve 21. The boom 27 is formed from discrete segments 30 fastened end-to-end in threaded engagement or by other means to provide various lengths, predetermined by the depth into the tube bundle at which the tubes are being cut. A hydraulic cylinder 31 is fastened to the sleeve 21 and to the segment 30 disposed therein by a bracket 32 to automatically move the boom 27 axially with respect to the sleeve 21.

Figure 6:
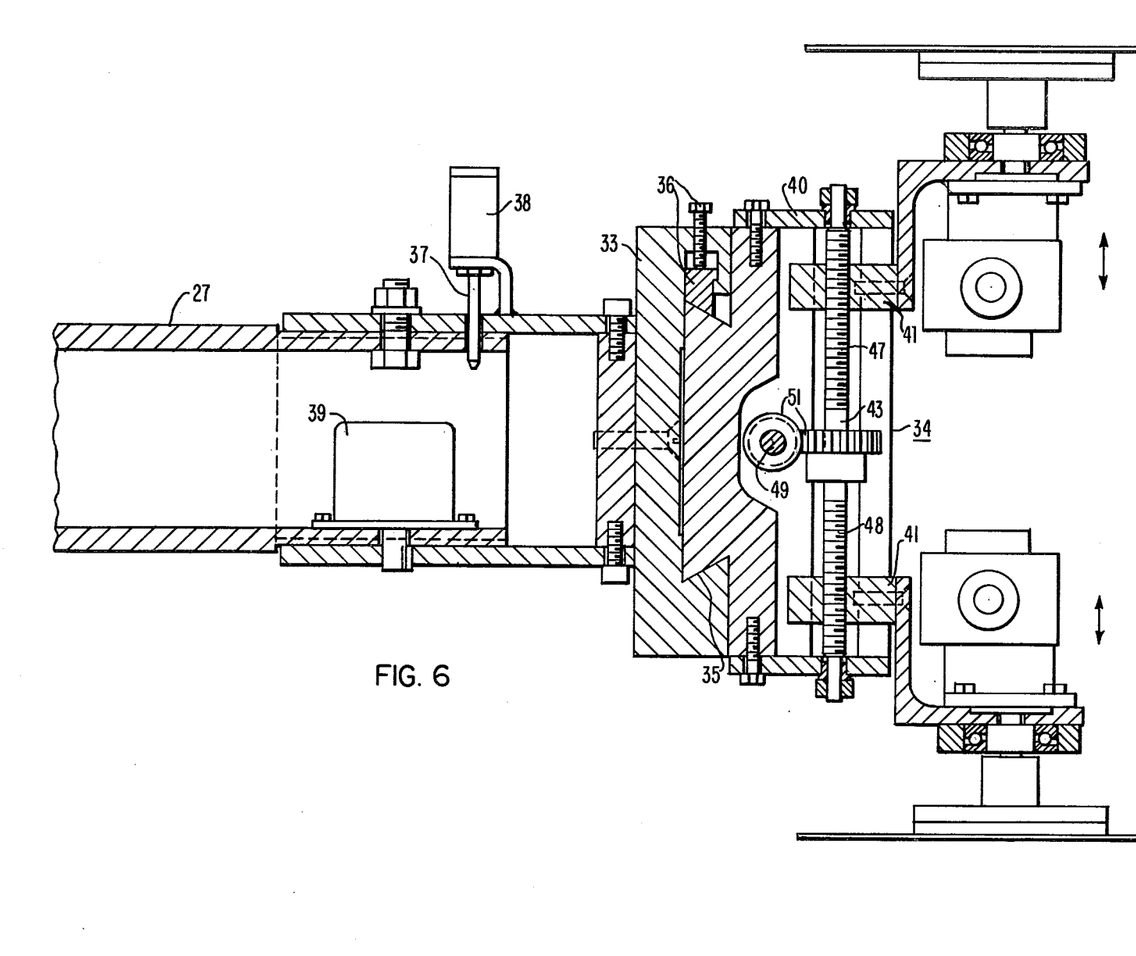
FIG. 6 is a sectional view of a cutting head assembly.
Figure 7:
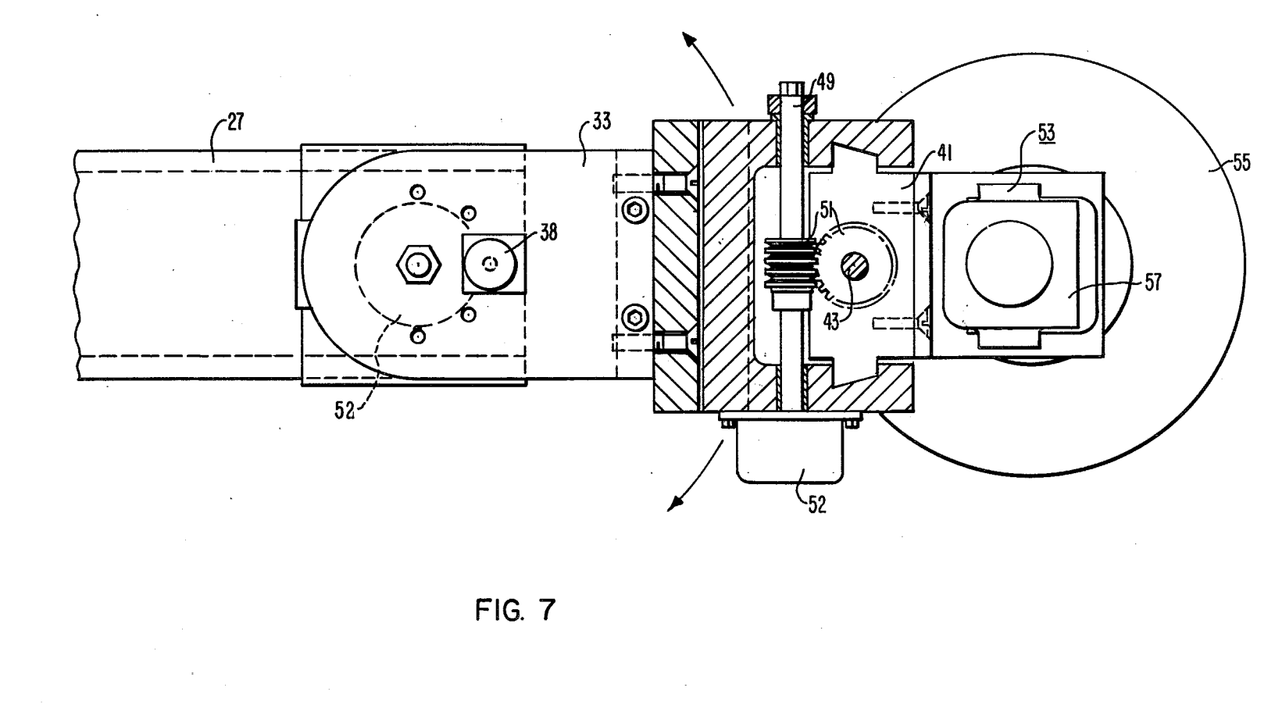
FIG. 7 is a plan view, partially in section, of a cutting head assembly.
Figure 8:
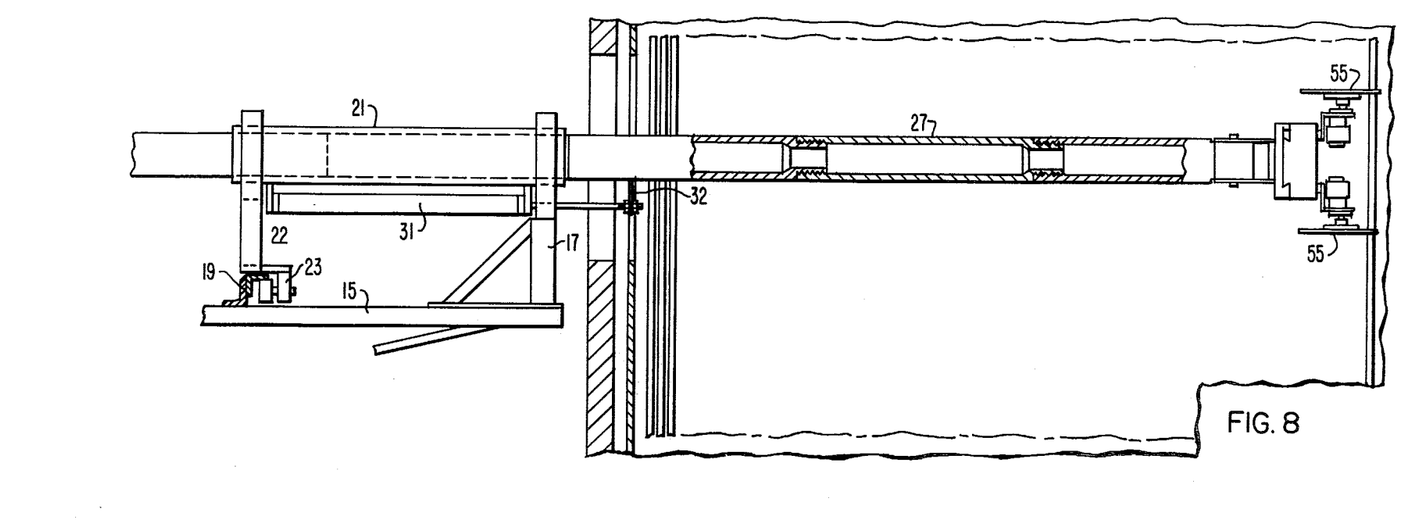
FIG. 8 is an elevational view of a boom, sleeve and adjustable base utilized in the cutting apparatus.

As shown in FIGS. 6 and 7, a mounting bracket 33 is pivotally disposed on one end of the boom 27 to pivot the mounting bracket 33 in a generally horizontal plane and a cutting assembly 34 is removably fastened thereto by a dovetail 35 and has a locking arrangement 36 cooperatively associated therewith. A pin 37 actuated by a pneumatic cylinder 38 is utilized to affix the pivotal position of the mounting bracket 33 at predetermined angles with respect to the axis of the boom 27. A hydraulic motor 39 pivots the mounting bracket 33 to the proper position to cut tubes disposed in the corners as shown in phantom in FIG. 2.

The cutting assembly 34 comprises a housing 40. Slidably disposed in the housing 40 are a pair of cutter mounts 41. A threaded shaft 43 is rotatably mounted in the housing 40 and has right-hand thread portions 47 adjacent one end thereof and left-hand thread portions 48 adjacent the other end thereof. The cutter mounts 41 have threaded holes which engage the threads 47 and 48 on the threaded shaft 43 so that when turned in one direction the cutter mounts 41 move toward each other and when rotated in the opposite direction the cutter mounts 41 move away from each other. A drive shaft 49 is rotatably disposed in the housing 40. Mating helical gears 51 are disposed on the drive shafts 43 and 49, respectively, to transmit rotation therebetween. A motor 52 or other drive means is attached to the drive shaft 49 to rotate it and remotely actuate the drive shaft 43 and move the cutter mounts 41.

Cutters 53 are disposed in each of the cutter mounts 41 and comprise an abrasive cutting disc, saw blade or other cutting means 55 and a hydraulic motor 57 so disposed that the discs are generally parallel and axially aligned with the motors 57 disposed adjacent each other. The hydraulic motors 57 deliver high torque and are relatively small in size.

Figure 9:
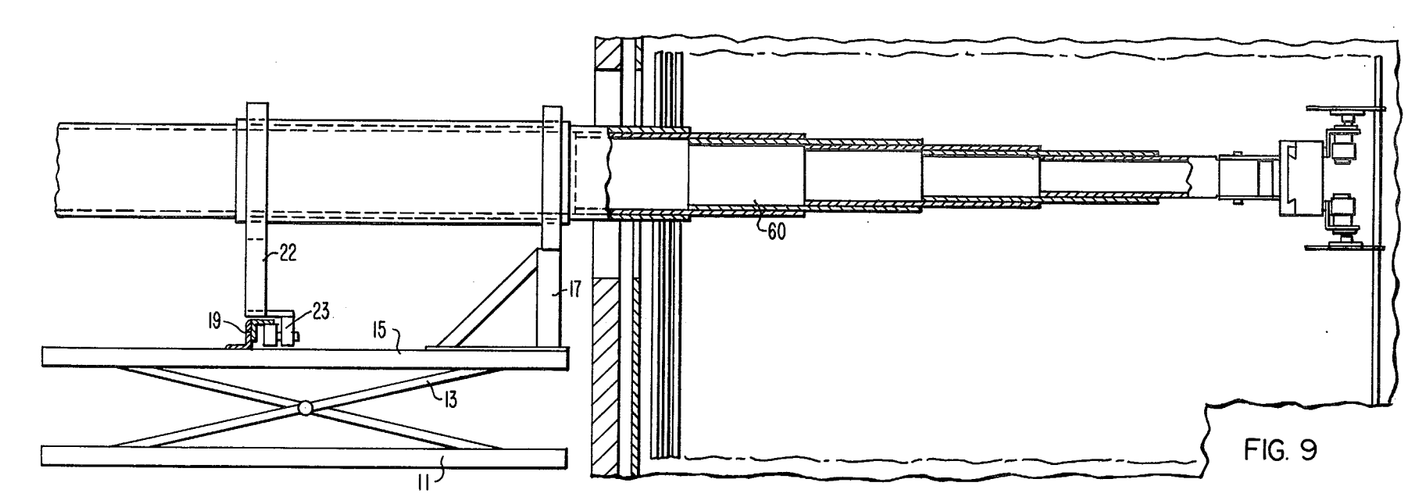
FIG. 9 is an elevational view of an alternate boom and adjustable base utilized in the cutting apparatus.

FIG. 9 shows an alternate boom 60 in which the segments 61 telescope within each other to extend the boom into the tube bundle 3.

Figure 10:
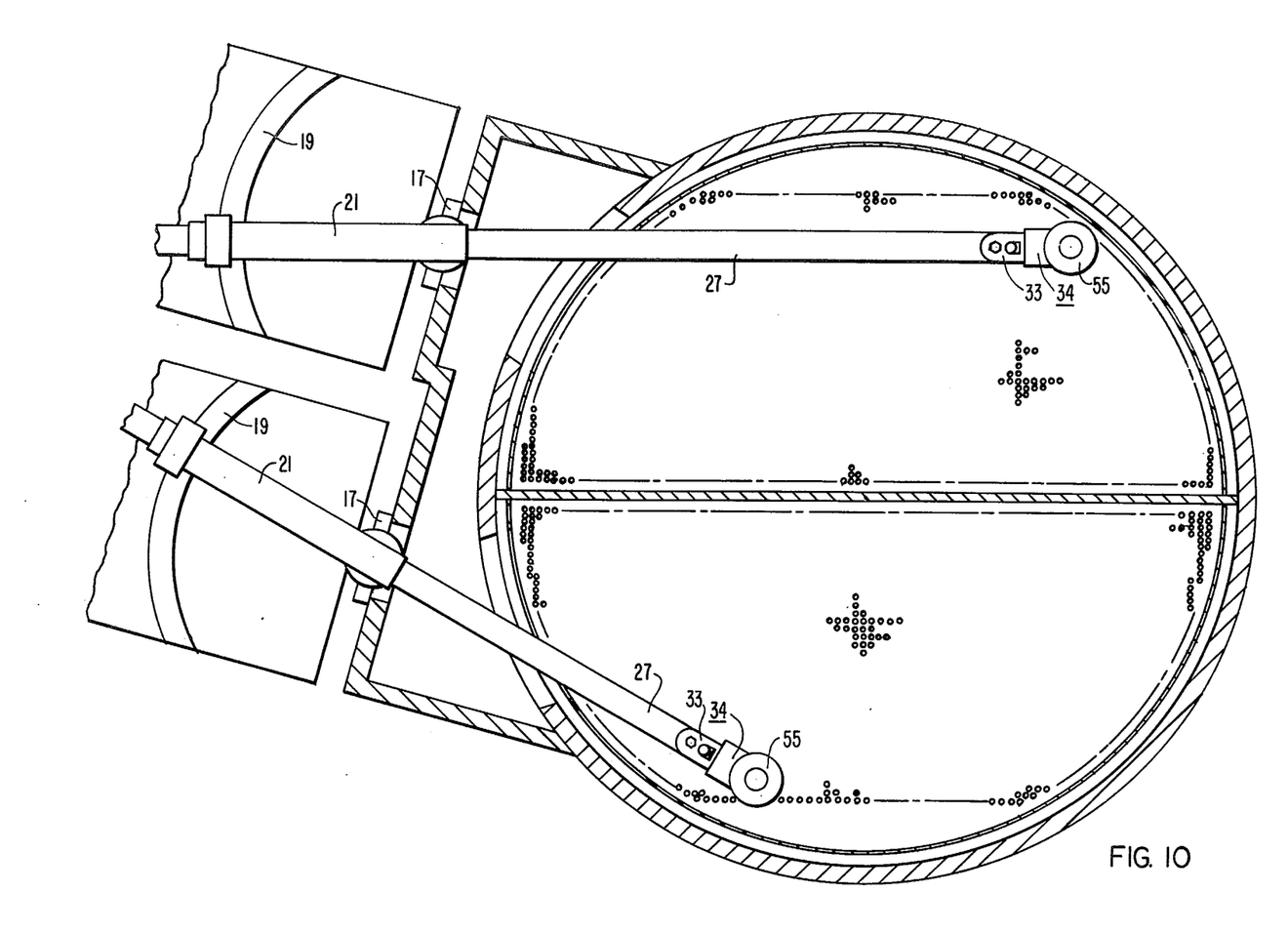
FIG. 10 is a plan view of the cutting apparatus with the vessel in section.

As shown in FIG. 10, a radiation shield 61 made of lead glass and steel plate is disposed adjacent the opening in the vessel and adjacent the pivot on the sleeve 21 and has an opening for receiving the boom 27. The radiation shield 61 is utilized if radiation protection is required due to an unacceptable radiation level on the shell side of the vessel during the cutting operation.

The apparatus hereinbefore described facilitates cutting through a large diameter closely packed tube bundle 3 in order to free the tube bundle 3 from the tubesheet.

We claim:

1. Apparatus for cutting through a tube bundle formed from closely packed tubes while the tube bundle is disposed within a vessel, said apparatus comprising:
    a base,
    a boom pivotally mounted with respect to said base to generally move in a plane transverse to the longitudinal axis of said tube bundle,
    a pair of cutting discs rotatably disposed on one end of said boom,
    said discs being disposed in planes generally parallel to said transverse plane,
    means for rotating said discs, and
    means for moving said discs toward and away from each other,
    whereby short segments of tubes can be cut from said tube bundle to cut through the tube bundle and free it.

2. The apparatus as set forth in claim 1, wherein the boom is made up of segments which are cooperatively associated to form a boom having predetermined lengths.

3. The apparatus as set forth in claim 1, wherein the boom is formed from discrete segments fastened end-to-end to form a boom of predetermined lengths.

4. The apparatus as set forth in claim 1, wherein the boom is formed from telescoping segments which slide relative to each other to form a boom of predetermined lengths.

5. The apparatus as set forth in claim 1, wherein the means for rotating the discs are hydraulic motors whereby high torque may be developed with physically small motors.

6. The apparatus as set forth in claim 1 and further comprising a mounting bracket fastened to one end of the boom and a cutting assembly removably disposed in said mounting bracket, said cutting assembly having discs and means for rotating them disposed therein.

7. Apparatus as set forth in claim 6, wherein the cutting apparatus comprises a housing removably attached to said mounting bracket, a pair of motor mounts cooperatively associated with said housing so that they move toward and away from each other, and means connecting said motor mounts for moving them toward and away from each other in unison.

8. The apparatus as set forth in claim 7, wherein the means connected to said motor mounts for moving them toward and away from each other comprise a threaded shaft having right and left-hand threads disposed on opposite ends thereof, a threaded hole in each of said motor mounts disposed to engage the appropriate thread of said threaded shaft, a gear intermediately disposed on said threaded shaft between said threaded portions, a second shaft rotatably disposed in said housing, said second shaft having a gear disposed thereon disposed to engage said gear on said threaded shaft, and means for rotating said second shaft to move said motor mounts toward and away from each other in unison.

9. The apparatus as set forth in claim 1 and further comprising a sleeve in which the boom is slidably disposed, said boom and sleeve having means cooperatively associated therewith to prevent relative rotation therebetween and to allow longitudinal sliding therebetween.

10. The apparatus as set forth in claim 9, wherein the sleeve is pivotally mounted with respect to the base on one end and has a leg disposed on the other end, the base has an arcuate track disposed thereon and said leg has a foot disposed thereon which engages the track to generally keep the axis of the sleeve and boom in said transverse plane.

11. The apparatus as set forth in claim 1 and further comprising means for adjusting the elevation of said apparatus.

12. The apparatus as set forth in claim 1 and further comprising a see-through radiation shield to protect the operator from the radiation of the tube bundle.

13. Apparatus for cutting through a tube bundle formed from closely packed tubes while the tube bundle is disposed within a vessel, said apparatus comprising:
    a base,
    a boom pivotally mounted with respect to said base to generally move in a plane transverse to the longitudinal axis of said tube bundle,
    means for cutting the tubes at two places disposed on one end of said boom, and
    means for moving said cutting means toward and away from each other,
    whereby short segments of tubes can be cut from the tube bundle to cut through the tube bundle and free it from the vessel.

14. The apparatus as set forth in claim 13, wherein the boom is made up of segments which are cooperatively associated to form a boom having predetermined lengths.

15. The apparatus as set forth in claim 13, wherein the boom is formed from discrete segments fastened end-to-end to form a boom of predetermined lengths.

16. The apparatus as set forth in claim 13, wherein the boom is formed from telescoping segments which slide relative to each other to form a boom of predetermined length.

17. The apparatus as set forth in claim 13 and further comprising a mounting bracket fastened to one end of the boom and a cutting assembly removably disposed in said mounting bracket.

* * * * *